United States Patent
Yasuda (10) Patent No.: US 8,023,035 B2
(45) Date of Patent: Sep. 20, 2011

(54) AUTO-FOCUSING APPARATUS AND IMAGE PICKUP APPARATUS INCLUDING THE SAME

(75) Inventor: Hitoshi Yasuda, Itabashi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1179 days.

(21) Appl. No.: 11/135,117

(22) Filed: May 23, 2005

(65) Prior Publication Data

US 2005/0275744 A1 Dec. 15, 2005

(30) Foreign Application Priority Data

Jun. 15, 2004 (JP) ................... 2004-177647

(51) Int. Cl.
*H04N 5/232* (2006.01)
*H04N 5/225* (2006.01)
*G03B 13/34* (2006.01)

(52) U.S. Cl. ............... 348/345; 348/353; 348/220.1; 396/135

(58) Field of Classification Search .............. 348/353, 348/354, 345, 355, 356, 220.1; 396/133, 396/135
See application file for complete search history.

(56) References Cited

U.S. PATENT DOCUMENTS

| 5,115,262 | A | 5/1992 | Komiya | |
|---|---|---|---|---|
| 5,212,516 | A * | 5/1993 | Yamada et al. | 348/354 |
| 5,440,343 | A * | 8/1995 | Parulski et al. | 348/220.1 |
| 6,067,115 | A * | 5/2000 | Suda | 348/354 |
| 6,342,922 | B1 * | 1/2002 | Mizoguchi | 348/356 |
| 6,441,855 | B1 | 8/2002 | Omata et al. | |
| 6,636,266 | B2 * | 10/2003 | Takahashi | 348/349 |
| 6,727,949 | B1 * | 4/2004 | Saruwatari et al. | 348/354 |
| 2003/0048372 | A1 * | 3/2003 | Yasuda | 348/349 |
| 2004/0017502 | A1 | 1/2004 | Alderson | |
| 2004/0119871 | A1 * | 6/2004 | Nobuoka | 348/349 |

FOREIGN PATENT DOCUMENTS

| JP | 7-107359 A | 4/1995 |
|---|---|---|
| JP | 2002-072074 A | 3/2002 |

* cited by examiner

*Primary Examiner* — Nhan T Tran
(74) *Attorney, Agent, or Firm* — Canon USA Inc. IP Division (57) ABSTRACT

An auto-focusing apparatus and an image pickup apparatus reliably achieving a focal state in accordance with a recording format are provided. In each apparatus, auto-focus adjustment is implemented by modifying a process of generating an AF evaluation value indicating a sharpness of an image, in accordance with an image-taking mode (a recording type).

4 Claims, 10 Drawing Sheets

AUTO-FOCUSING APPARATUS AND IMAGE PICKUP APPARATUS INCLUDING THE SAME

BACKGROUND OF THE INVENTION

1. Field of the Invention

The present invention generally relates to an image pickup apparatus, and more particularly, it relates to an auto-focusing apparatus of the image pickup apparatus. The present invention is suitable for, for example, an auto-focusing apparatus and an image pickup apparatus performing optimal auto-focus control in accordance with a format of a recording signal.

2. Description of the Related Art

In recent years, the main stream of an auto-focus (AF) apparatus of a video camera is of a type in which a sharpness of a screen is detected from an image signal obtained by photoelectrically converting an object image with an image pickup device (e.g., a CCD) and so forth, so as to serve as an AF evaluation value, and focus adjustment is performed by controlling the position of a focus lens so as to achieve a maximum AF evaluation value.

Figure 11:
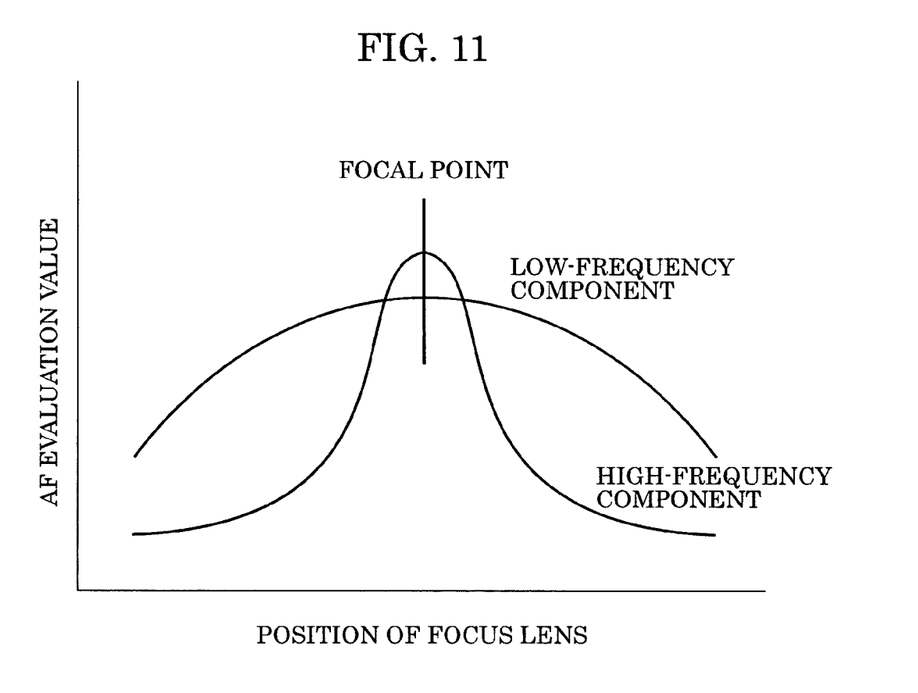
FIG. 11 is a graph illustrating the relationships between position of the focus lens and AF evaluation values with respect to high and low frequency components of an image signal.

A level of a high frequency component of an image signal extracted by a band-pass filter is generally used as an AF evaluation value. In other words, as shown in FIG. 11, when a normal object is photographed, the more the object is brought into focus (the closer the object comes to a focal point), an AF evaluation value becomes greater. As such, a point making the level maximum thereat is defined as a focal position. Meanwhile, it is known that an AF evaluation value has a characteristic that making the center frequency of the band-pass filter higher relative to the frequency band of an image signal leads to a graph of the AF evaluation value having a sharp shape, and making the same lower leads it having a gentle shape. FIG. 11 is a graph of the relationships between position of a focus lens and AF evaluation value of each of the high and low frequency components of an image signal, wherein the vertical and horizontal axes respectively indicate an AF evaluation value and a position of the focus lens value.

The frequency characteristic of the band-pass filter extracting an AF evaluation value is set such that a sufficient variation (reduction) in the AF evaluation value is obtained by moving the focus lens in the neighborhood of its focal point and within its focal depth, so as to clearly notice the peak of the AF evaluation value, and also that, even when the focus lens moves in a direction away from the focal point, a clear difference of the AF evaluation value can be obtained with movement of the focus lens of the order of its focal depth.

Meanwhile, with respect to recording types, other that a known type of standard definition (SD) format (720 H×480 V), a type of a high definition (HD) format (1440 H×1080 V) higher than the known SD type is proposed. Corresponding to such formats, a video camera generating an image signal with the HD format from all area of the CCD and another image signal with the SD format from a part of the area of the CCD by applying a reduction process on it, and recording these signals is proposed. For such a video camera having image-taking modes of mutually different recording types as described above, a method for generating an AF evaluation value by applying the common process on an image signal with the HD format, and controlling the position of the focus lens so as to adjust the focal point. (to perform AF control) is proposed (see Japanese Patent Laid-Open No. 7-107359, for example)

With the method proposed in the above-mentioned patent document, regardless of recording formats of an image signal, an AF evaluation value is generated by applying the common process on the image signal so as to perform the AF control. Accordingly, the band-pass filter having a frequency characteristic adjusted for the HD format is set such that, even when the focus lens is driven in the neighborhood of the focal point by an amount of a focal depth in accordance with the HD format, a change (decrease) in the AF evaluation value is obtained so as to notice its peak. Corresponding to the above setting, determining values of a focus move quantity, a change in the evaluation value, and the like are set for performing the AF control.

Unfortunately, since an image is displayed in a reduced manner in accordance with the SD format, a focus move quantity for noticing a blue on a screen is greater than that with the HD format. Accordingly, with the same focus move quantity, a change in blur on a display screen of an image signal is less noticeable with the SD format than with the HD format, thereby causing a photographer more difficult to notice movement of AF. In other words, when an AF operation in accordance with the SD format is performed in the same fashion as performed in accordance with the HD format, availability for coping with the AF is considerably deteriorated.

When the generation process of an AF evaluation value with the SD format is arranged for the HD format, the band-pass filter has a high center frequency, and the AF evaluation value has a sharper characteristic shape than that with the known SD format. Hence, it is difficult to determine a direction of the focal point at occurrence of a large blur, thereby resulting in a poorer AF performance than those of other models exclusive for the SD format.

Whereas, when the band-pass filter having a frequency characteristic arranged for the SD format is used, the AF evaluation value has a broader shape with respect to the position of the focus lens, whereby the focal point is not clearly noticed even when the focus lens is driven in the neighborhood of the focal point, within the focal depth in accordance with the HD format.

Although AF evaluation values optimal respectively for the HD and SD formats are needed, no image pickup apparatus and/or no AF apparatus generating an optimal AF evaluation value for itself in accordance with a format type is heretofore present.

SUMMARY OF THE INVENTION

The present invention has been made in consideration of the above situation, and provides an auto-focusing apparatus, an image pickup apparatus, and a control method thereof, to reliably achieve a focal state in accordance with an image-taking mode (a recording type).

According to the present invention, an auto-focusing apparatus is provided which includes a first-signal generation unit generating a first image signal from an object light-flux reflecting an object, an evaluation-value generation unit generating an auto-focus (AF) evaluation value indicating a sharpness of an image from the image signal, a control unit controlling a focusing member adjusting the position of a focal point of the object light-flux so as to achieve a maximum AF evaluation value, a second-signal generation unit generating an image signal from the first image signal, corresponding to at least two mutually different recording formats, and a modification unit modifying a characteristic of the evaluation-value generation unit in accordance with the corresponding one of the recording formats.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described in detail in accordance with the accompanying drawings. Like parts in respective figures are identified by the same numbers and their descriptions are not repeated.

Figure 1:
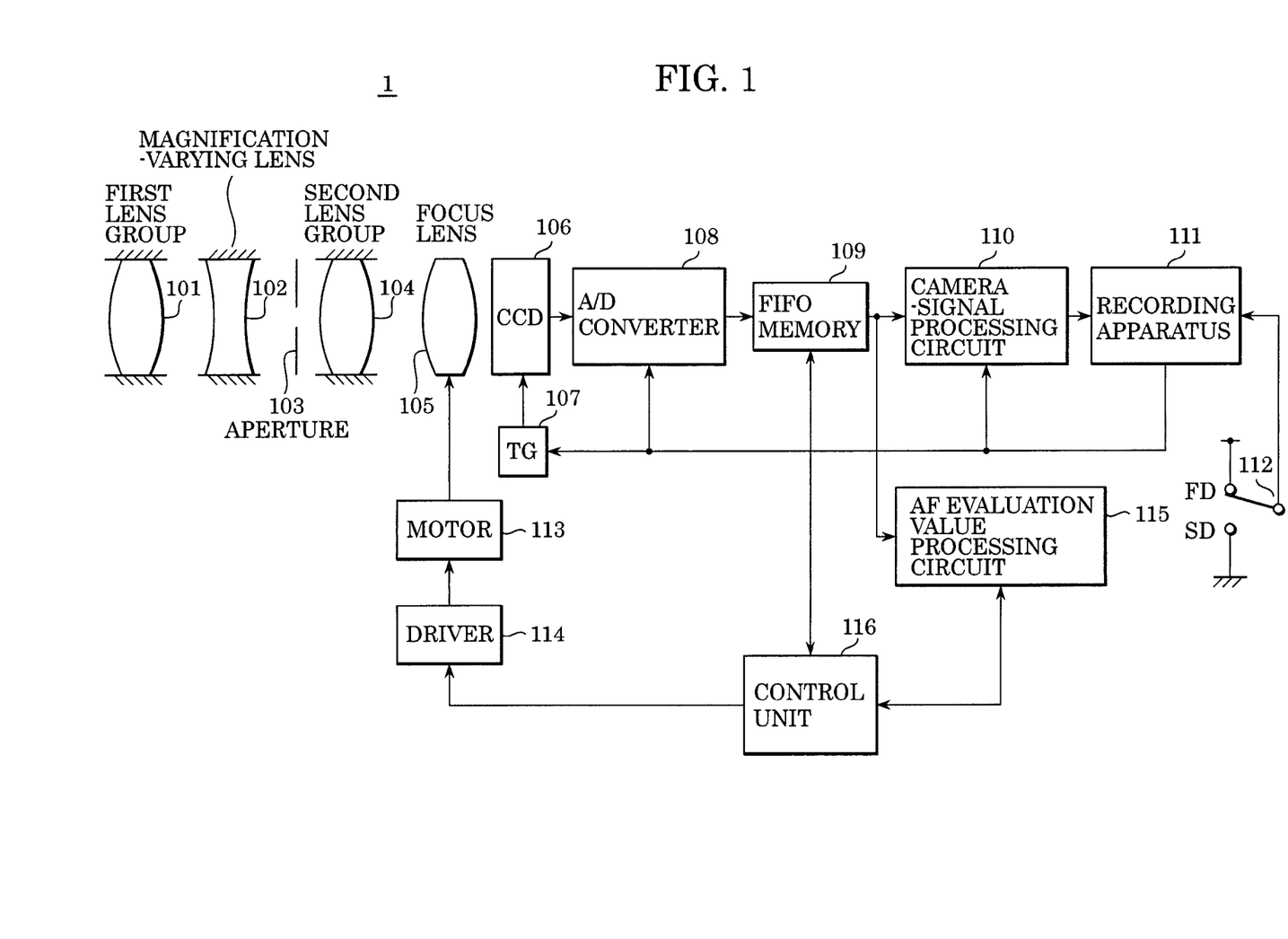
FIG. 1 is a general block diagram of an image pickup apparatus according to one aspect of the present invention.

FIG. 1 is a general block diagram of an image pickup apparatus 1 according to an embodiment of the present invention. As shown in FIG. 1, the image pickup apparatus 1 includes a fixed first lens group 101, a magnification-varying lens 102 performing magnification-varying, an aperture 103 serving as an exposing unit for adjusting a quantity of light passing through the first lens group 101 and the magnification-varying lens 102, a fixed second lens group 104, and a focus compensation lens (hereinafter, referred to as a focus lens) 105 having a combined function of compensating for movement of a focal surface caused by the magnification-varying and focusing.

Figure 2:
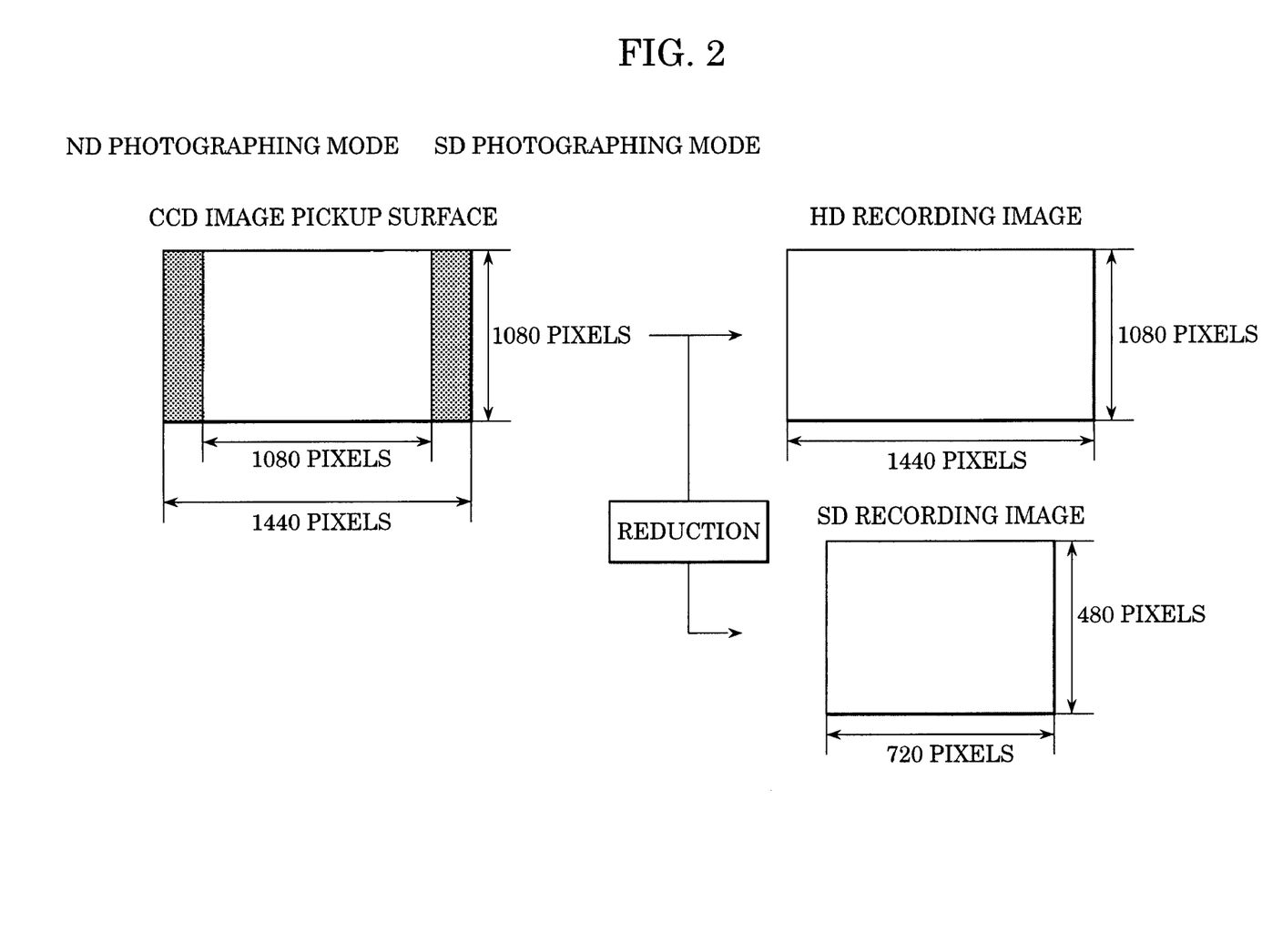
FIG. 2 is a general plan view of an example CCD of the image pickup apparatus shown in FIG. 1.

The image pickup apparatus 1 also includes a solid-state image pickup device 106, such as a charge coupled device (CCD) on which an object image passing through the first lens group 101, the magnification-varying lens 102, the aperture 103, the second lens group 104, and the focus lens 105 is formed and which photoelectrically converts the object image. As shown in FIG. 2, the CCD 106 according to the present embodiment has sufficient pixels for a high definition (HD) format and an aspect ratio of 16:9. FIG. 2 is a general plan view of the CCD 106 of the image pickup apparatus 1.

As is seen from FIG. 2, with respect to a standard definition (SD) format and the HD format, the CCD 106 generates, for example, an image signal in accordance with the HD format (1440 H×1080 V) from an area (1440 H×1080 V) having an aspect ratio of 16:9 and another image signal in accordance with the SD format (720 H×480 V) from an area (e.g., 1080 H×1080 V) having an aspect ratio of 4:3 by applying a reduction process on it.

Turning back to FIG. 1, the image pickup apparatus 1 further includes a pulse generator (a timing generator (TG)) 107 generating a timing signal at a predetermined timing for driving the CCD 106 and a CDS/AGC/A/D converter 108 (hereinafter referred to as an A/D converter) converting (digitalizing) an electrical signal photoelectrically converted by the CCD 106 into a digital image signal after being subject to sampling and gain adjustment.

The image pickup apparatus 1 also includes a first-in first-out (FIFO) memory 109 and a camera-signal processing circuit 110, which will be described later. The FIFO memory 109 cuts out only a signal (e.g., all 1440 pixels per 1 H with the HD format, and only 1080 pixels per 1 H with the SD format) from an output of the A/D converter 108 along the H-direction, existing in an area to be used in the camera-signal processing circuit 110 and adjusts a timing of a clock.

The camera-signal processing circuit 110 processes an output signal of the FIFO memory 109 into a signal corresponding to a recording apparatus 111, which will be described later. The camera-signal processing circuit 110 generates, for example, an image signal of 1440 H×1080 V with the HD format and an image signal of 720 H×480 V with the SD format, by applying a reduction process on it.

The image pickup apparatus 1 further includes the recording apparatus 111 including a magnetic tape, an optical disk, a semiconductor memory, and recording image data, and a selection switch 112 selecting a recording mode between the HD and SD formats.

The image pickup apparatus 1 further includes a control unit 116, which will be described later, a motor 113 serving as an actuator driving the focus lens 105, and a driver 114 driving the motor 113 in response to a signal from the control unit 116.

The image pickup apparatus 1 still further includes an AF evaluation-value processing circuit 115 extracting a high frequency component of an output signal of the FIFO memory 109, used for detection a focal point, and the control unit 116 controlling the driver 114 so as to drive the focus lens 105 on the basis of an output signal of the AF evaluation-value processing circuit 115.

A photographing operation of the image pickup apparatus 1 will now be described. A quantity of a light flux of an object, passing through the first lens group 101 and the magnification-varying lens 102 of the image pickup apparatus 1, is adjusted by the aperture 103, and an image of the light flux is then formed on the light receiving surface of the CCD 106 through the second lens group 104 and the focus lens 105. The object image is converted into an electrical signal by photo-electrical conversion of the CCD 106 and outputted to the A/D converter 108. The A/D converter 108 applies a variety of signal processes on the received signal so as to generate a predetermined signal and to convert it into a digital signal (image data).

Only a part of the digital signal outputted from the A/D converter 108, existing in an area to be used in the signal processing circuit 110, is cut out by the FIFO memory 109, sent to the signal processing circuit 110, processed into a signal corresponding to the recording apparatus 111, and recorded as an image signal in the recording apparatus 111.

The image signal cut out by the FIFO memory 109 is outputted to the AF evaluation-value processing circuit 115, in addition to the signal processing circuit 110 as described above. Upon receiving the signal, the AF evaluation-value processing circuit 115 extracts its high frequency component with a band-pass filter and so forth and computes an AF evaluation value. As described above, the AF evaluation-value processing circuit 115 has a high-frequency extraction unit for detecting, in a step of performing AF control, a predetermined high frequency component of an image signal generated by the CCD 106.

The TG 107 outputs a predetermined timing signal to the CCD 106. In response to the received timing signal, the CCD 106 is driven in synchronization with the timing signal.

The control unit 116 drives the focus lens 105 with the motor 113 by controlling the driver 114. That is, on the basis of the AF evaluation value computed by the AF evaluation-value processing circuit 115, the control unit 116 drives the motor 113 by controlling the driver 114 and performs the AF control so as to move the focus lens 105 to a focal position.

Figure 3:
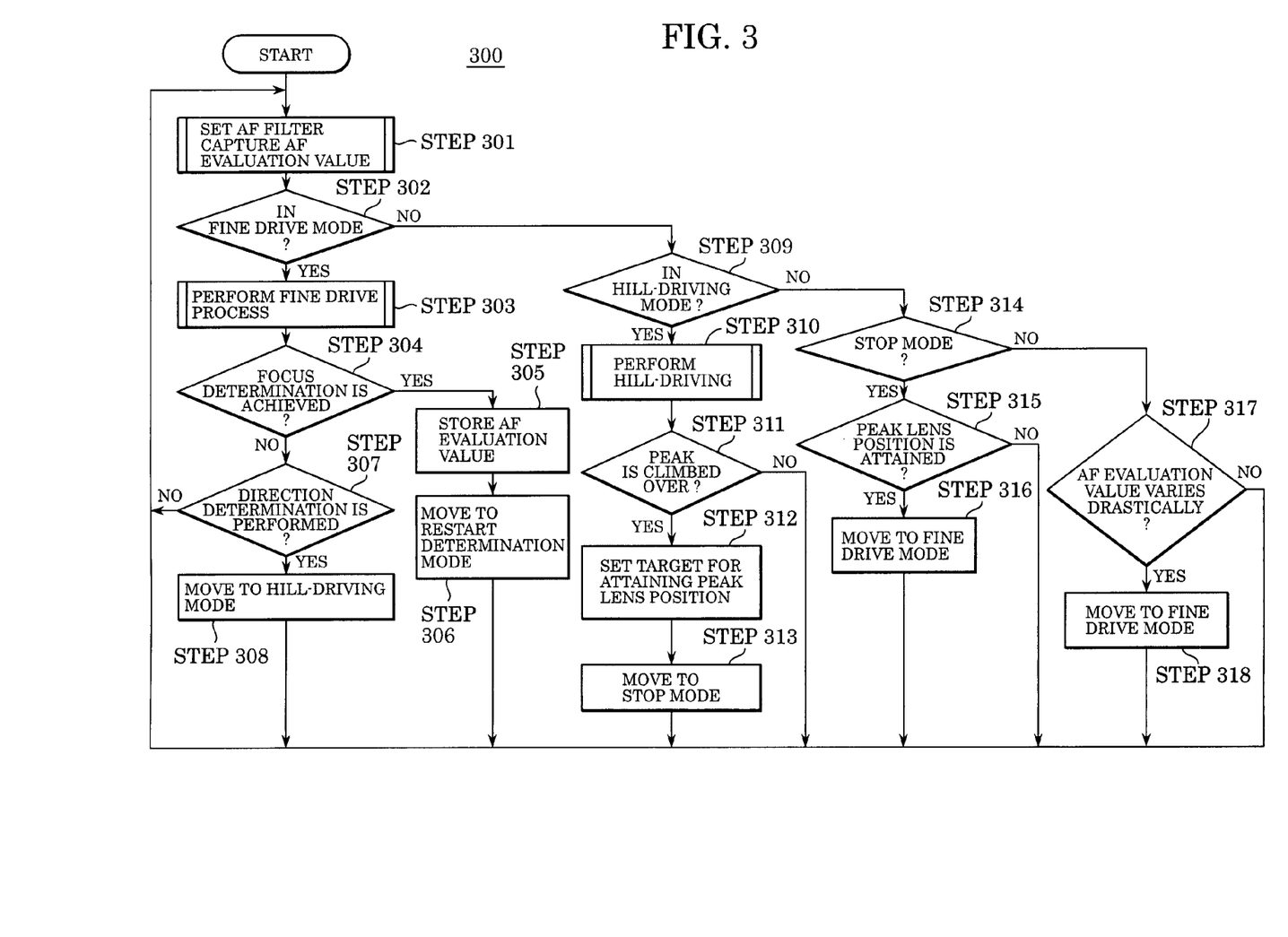
FIG. 3 is a flowchart of AF control of the image pickup apparatus.

The AF control performed by the control unit 116 of the image pickup apparatus 1 will now be described in detail with reference to FIGS. 3 to 9. FIG. 3 is a flowchart of AF control 300 performed in the image pickup apparatus 1.

Figure 4:
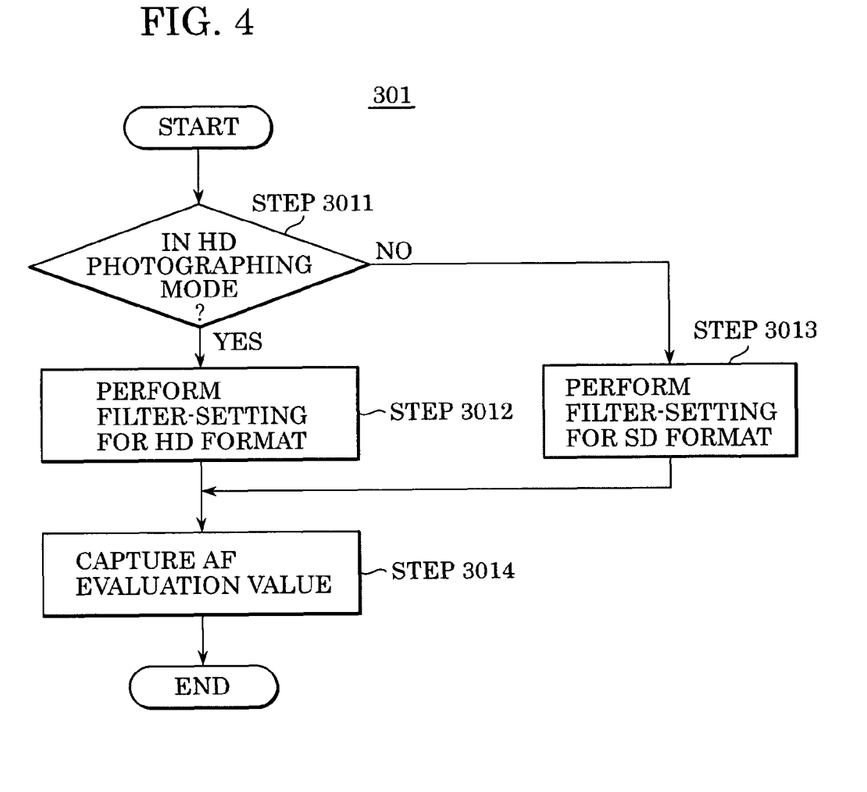
FIG. 4 is a detailed flowchart of Step 301 shown in FIG. 3, in which a filter factor is set and an AF evaluation value is captured.

FIG. 3 is a flowchart of AF control 300 performed in the image pickup apparatus 1. The control unit 116 changes the frequency characteristic of the band-pass filter in the AF evaluation-value processing circuit 115 by setting a filter factor, which will be described later, and captures an AF evaluation value from the AF evaluation-value processing circuit 115 (Step 301). Capturing of the AF evaluation value and setting of the filter factor will now be described with reference to FIG. 4. FIG. 4 is a detailed flowchart of Step 301 where the setting of the filter factor and the capturing of the AF evaluation value are performed.

It is determined first which one of HD and SD format modes is selected as the image-taking mode of the image pickup apparatus 1 (Step 3011). While the image pickup apparatus 1 determines whether the HD format mode is selected in the present embodiment by way of example, as a matter of course, those skilled in the art will appreciate that the apparatus may determine whether the SD format mode is selected.

Figure 5:
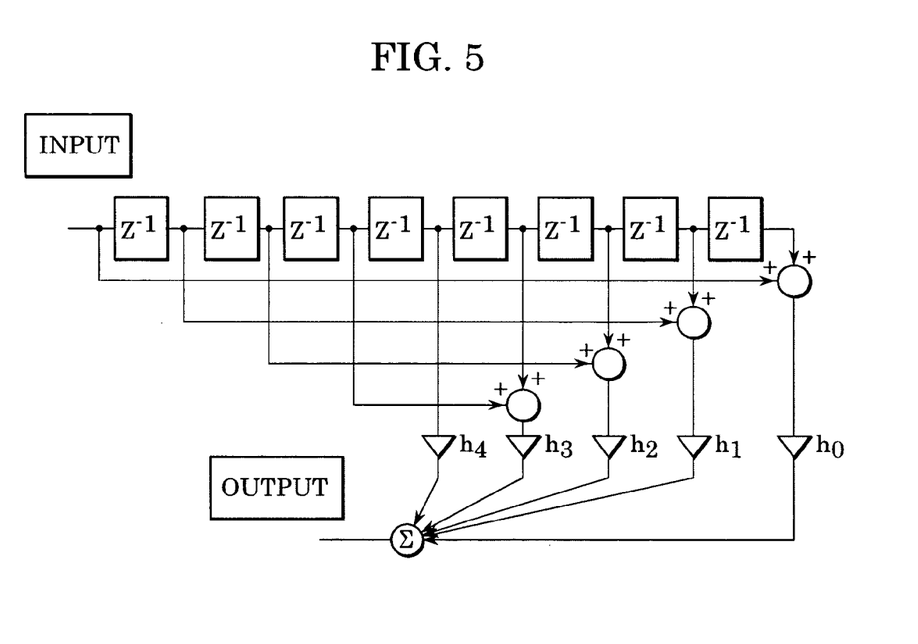
FIG. 5 is a general block diagram of an example structure of a finite impulse response (FIR) digital filter as a band-pass filter.

If the image-taking mode of the image pickup apparatus 1 is the HD format mode, filter-setting for the HD format is performed (Step 3012), and if it is the SD format mode (that is, it is not the HD format mode), the filter-setting for the SD format is performed (Step 3013). Meanwhile, the filter-setting unit changing of a set value of the band-pass filter in the AF evaluation-value processing circuit 115. More particularly, when the band-pass filter is an FIR digital filter as shown in FIG. 5, the set value of the band-pass filter can be changed by changing values $h_0$ to $h_4$ shown in FIG. 5. While the FIR digital filter is shown as an example band-pass filter in the present embodiment, the band-pass filter is not limited to this, and it may be of an infinite impulse response (IIR) type or of any other type that would allow practice of the present invention. FIG. 5 is a general block diagram of the FIR digital filter as an example of the band-pass filter.

Returning to FIG. 4, upon finishing setting the filter, an AF evaluation value corresponding to the set filter (that is, corresponding to the HD format mode or the SD format mode) is captured (Step 3014), and the process of Step 301 ends. For example, gain adjustment is performed such that the peaks of AF evaluation values in accordance with the respective HD and the SD formats agree with each other.

With Steps 3011 to 3013, a characteristic of an AF evaluation-value generating process can be changed in accordance with either one of image-taking modes of the mutually different HD and SD format modes, thereby providing optimal AF evaluation values for the respective image-taking modes.

As a result, in the SD format mode, the frequency characteristic of the band-pass filter is set so as to provide a similar characteristic of the AF evaluation value to that in a known SD format, thereby achieving an AF performance similar to that of a filter model exclusive for the SD format.

Whereas, in the HD format mode, when the focus lens 105 is driven in the neighborhood of the focal point within the focal depth in accordance with HD format by setting the center frequency of the band-pass filter higher than that in the SD format mode so as to achieve a shaper characteristic shape of the band-pass filter than that of an AF evaluation value in accordance with the SD format, the focal point is clearly noticed, thereby reliably achieving a focal state.

Returning to FIG. 3, upon finishing setting of the filter factor and capturing of the AF evaluation value, it is determined whether the image pickup apparatus 1 is in a fine drive mode (Step 302). If YES, a fine drive process is performed (Step 303), and if NO, the flow proceeds to Step 309, which will be described later.

Figure 6:
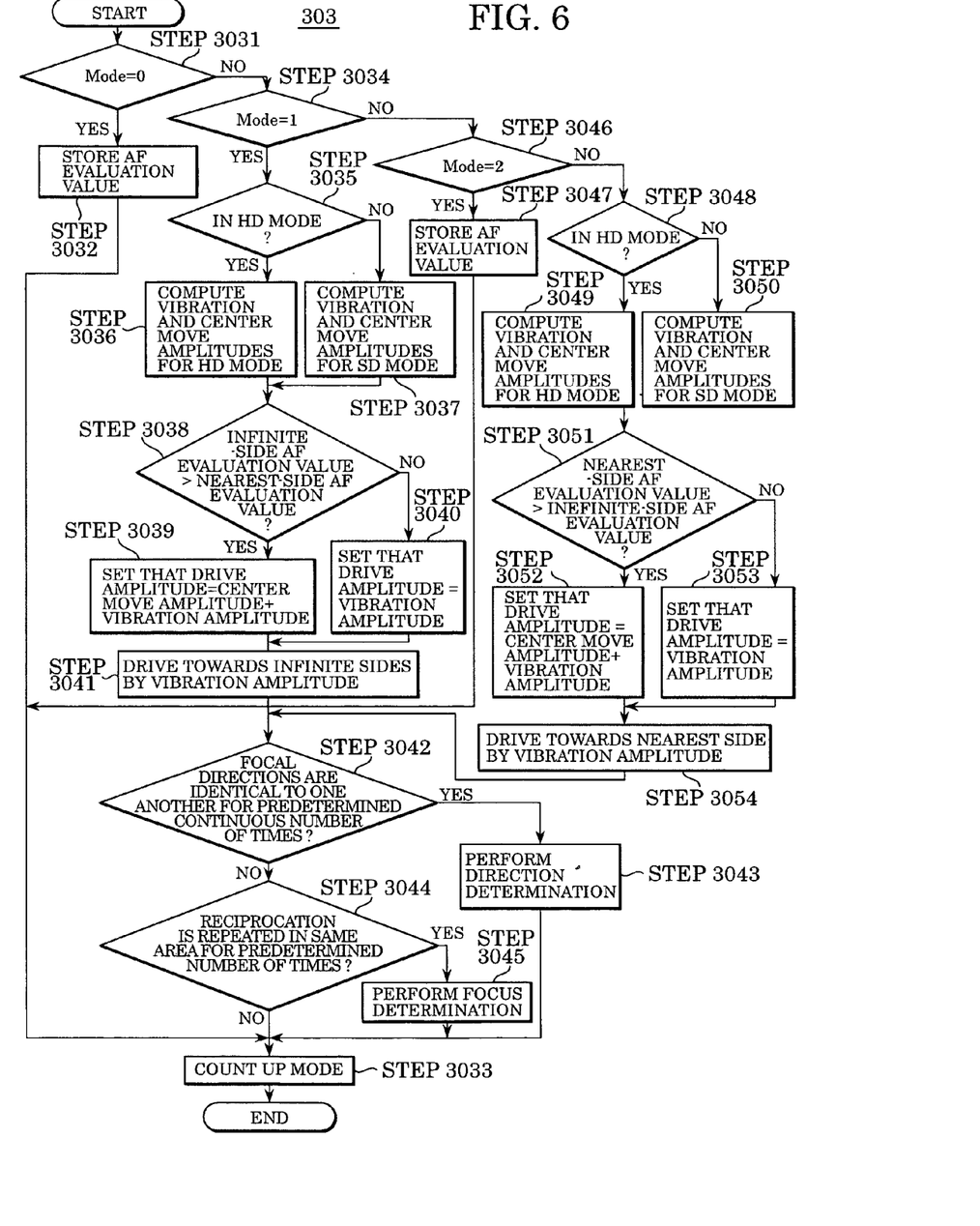
FIG. 6 is a detailed flowchart of Step 303 shown in FIG. 3, in which a fine drive process is performed.

In the fine drive process, by moving the focus lens 105 by a fine amplitude that is unnoticeably small on the screen, it is determined whether the focal state is achieved. If the focal state is not achieved, it is determined in which direction the focus lens 105 is driven for achieving the focal state, that is, in which direction the focal point exists. The fine drive process will now be described in detail with reference to FIG. 6. FIG. 6 is a detailed flowchart of Step 303 where the fine drive process is performed.

As is seen from FIG. 6, it is determined first whether the present mode is zero (Step 3031). If YES, the process at the lens position on the nearest side is performed, and if NO, the flow proceeds to Step 3034, which will be described later.

As the process at the lens position on the nearest side, an AF evaluation value is stored first as an infinite-side AF evaluation value (Step 3032). Meanwhile, the AF evaluation value described here is based on an image signal generated from electric charges charged in the CCD 106 when the focus lens 105 is disposed on the infinite side in a mode 2, which will be described later. Then, the mode is counted up (Step 3033), and the fine drive process (the process at the lens position on the nearest side) ends. When the mode becomes equal to or greater than four as a result of counting up, the mode is reset to zero.

If determined that the present mode is not zero in Step 3031, it is then determined whether the present mode is 1 (Step 3034). If YES, the process for driving the lens towards the infinite side is performed. If NO, the flow proceeds to Step 3046, which will be described later.

As the process for driving the lens towards an infinite distance, it is determined first which one of the HD and SD format modes is selected as the image-taking mode of the image pickup apparatus 1 (Step 3035). While, in the present embodiment, it is determined whether the image pickup apparatus 1 is in the HD format mode by way of example, as a matter of course, those skilled in the art will appreciate that it may be determined whether the same is in the SD format mode.

If the image-taking mode of the image pickup apparatus 1 is the HD format mode, a vibration amplitude and a center move amplitude for the HD format mode are computed (Step 3036). Each of these amplitudes is generally set, with respect to the focal depth, at a magnification so as to be unnoticeable on the screen.

If the image-taking mode of the image pickup apparatus 1 is the SD format mode (that is, the image-taking mode is not the HD format mode), a vibration amplitude and a center move amplitude for the SD format mode are computed (Step 3037). These amplitudes are generally set at magnifications, with respect to the focal depth and taking a reduction process into consideration, so as to be unnoticeable on the screen.

Upon completing computation of the vibration amplitude and the center move amplitude for the HD format or the SD format, an infinite-side AF evaluation value in a mode 0 and a nearest-side AF evaluation value in a mode 3 (corresponding to the HD or SD mode), which will be described later, are compared to each other (Step 3038).

If it is determined that the infinite-side AF evaluation value is greater than the nearest-side AF evaluation value in Step 3038, the drive amplitude of the lens is set at (the vibration amplitude+the center move amplitude) (Step 3039). If it is determined that the infinite-side AF evaluation is smaller than the nearest-side AF evaluation value, the drive amplitude of the lens is set at the vibration amplitude (Step 3040).

Subsequently, the focus lens 105 is driven towards the infinite side with the drive amplitude determined in Step 3039 or 3040 (Step 3041). Upon driving the focus lens 105, it is determined whether directions to be determined as a focal direction are identical to one another for a predetermined continuous number of times (Step 3042).

If YES, the focal direction is determined (Step 3043), and the flow proceeds to Step 3033. If NO, it is further determined whether the focus lens 105 repeats reciprocation in the same area for a predetermined number of times. (Step 3044).

If NO, the mode is counted up (Step 3033), and the fine drive process ends. If YES, focus determination is performed (Step 3045), and the flow proceeds to Step 3033.

If determined in Step 3034 that the present mode is not 1, it is then determined whether the present mode is 2 (Step 3046). If YES, a process at an infinite lens position is performed. If NO, the flow proceeds to Step 3048, which will be described later.

As the process at the infinite lens position, a captured AF evaluation value is stored as a nearest-side AF evaluation value (Step 3047), and the flow proceeds to Step 3033. Meanwhile, the AF evaluation value described here is based on an image signal generated from electric charges charged in the CCD 106 when the focus lens 105 is disposed on the nearest side in the mode 0.

If determined in Step 3046 that the present mode is not 2, it is determined as the mode 3. Then, it is determined which one of the HD and SD format modes is selected as the image-taking mode of the image pickup apparatus 1 (Step 3048).

If the HD format mode is selected, a vibration amplitude and a center move amplitude for the HD format mode are computed (Step 3049). These amplitudes are generally set at magnifications with respect to the focal depth so as to be unnoticeable on the screen.

If SD format mode is selected (that is, the image-taking mode is not the HD format mode), a vibration amplitude and a center move amplitude for the SD format are computed (Step 3050). These amplitudes are generally set, with respect to the focal depth and taking a reduction process into consideration, at magnifications so as to be unnoticeable on the screen.

Upon completing computation of the vibration amplitude and the center move amplitude for the HD or SD format, the infinite-side AF evaluation value in the mode 0 and the nearest-side AF evaluation value in the mode 2 are compared to each other (Step 3051).

In Step 3051, if it is determined that the nearest-side AF evaluation value is greater than the infinite-side AF evaluation value, the drive amplitude of the lens is set at (the vibration amplitude+the center move amplitude) (Step 3052), and if it is determined that the nearest-side AF evaluation value is smaller than the infinite-side AF evaluation value, the drive amplitude of the lens is set at the vibration amplitude (Step 3053).

Subsequently, the focus lens 105 is driven towards the infinite side with the drive amplitude determined in Step 3052 or Step 3053 (step 3054), and the flow proceeds to Step 3042.

Figure 7:
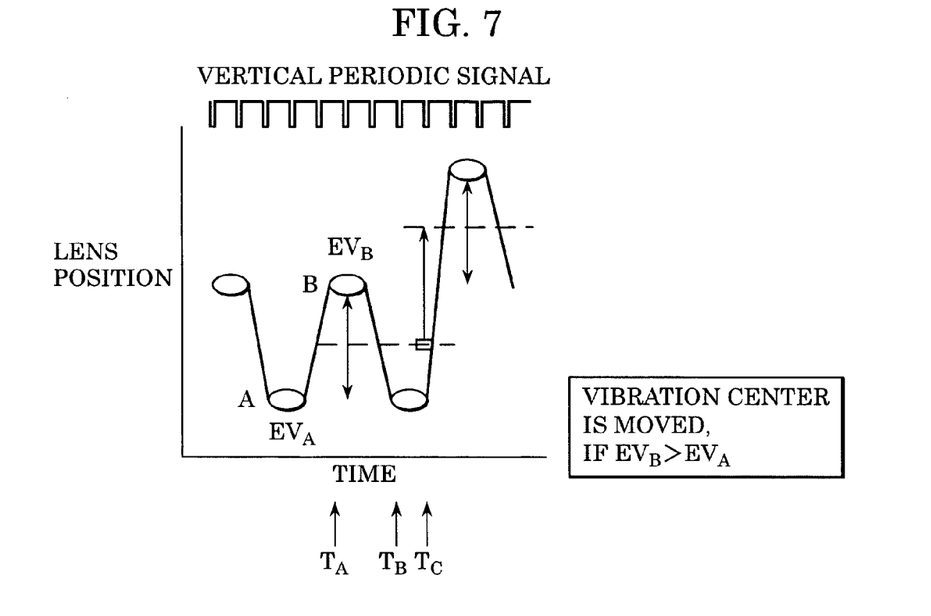
FIG. 7 is a graph illustrating the relationship between elapse of time and position of a focus lens when the fine drive process is performed.

FIG. 7 illustrates an operation of the focus lens 105 vs. elapse of time of the fine drive process performed in Steps 3031 to 3054. In FIG. 7, the horizontal and vertical axes respectively indicate time and position of the focus lens 105. Also, a periodic waveform shown in the upper part of the figure and protruding downwards represents a vertical synchronization signal of an image signal.

As is seen from FIG. 7, AF evaluation values $EV_A$ and $EV_B$ respectively corresponding to charges (shown by ellipses in the figure) charged in the CCD 106 during time periods A and B are captured in the control unit 116 at time $T_A$ and $T_B$. At time $T_C$, the AF evaluation values $EV_A$ and $EV_B$ are compared to each other. If $EV_B$ is greater than $EV_A$, the vibration center is shifted and if $EV_A$ is greater than $EV_B$, the vibration center is not shifted. Meanwhile, the movement of the focus lens 105 shown in FIG. 7 is set at a magnification so as to be unnoticeable on the screen, with respect to the focal depth.

Returning to FIG. 3, upon completion of the fine drive process (Step 303), it is determined whether the focus determination (Step 3045) is achieved (Step 304). If YES, an AF evaluation value in the focal state is stored (Step 305), and the flow proceeds to a restart determination mode (Step 306).

If NO, it is determined in the fine drive process (Step 303) whether determination of the focal direction (Step 3043) is performed (Step 307). If YES, the flow proceeds to a hill-climbing drive mode (Step 308). If NO, the flow returns to Step 302, and the fine drive process is continued.

In Step 302, if determined that the image pickup apparatus 1 is not in the fine drive mode, it is then determined whether the image pickup apparatus 1 is in the hill-climbing drive mode (Step 309). If YES, a hill-climbing drive process is performed (Step 310), and if NO, the flow proceeds to Step 314, which will be described later.

Figure 8:
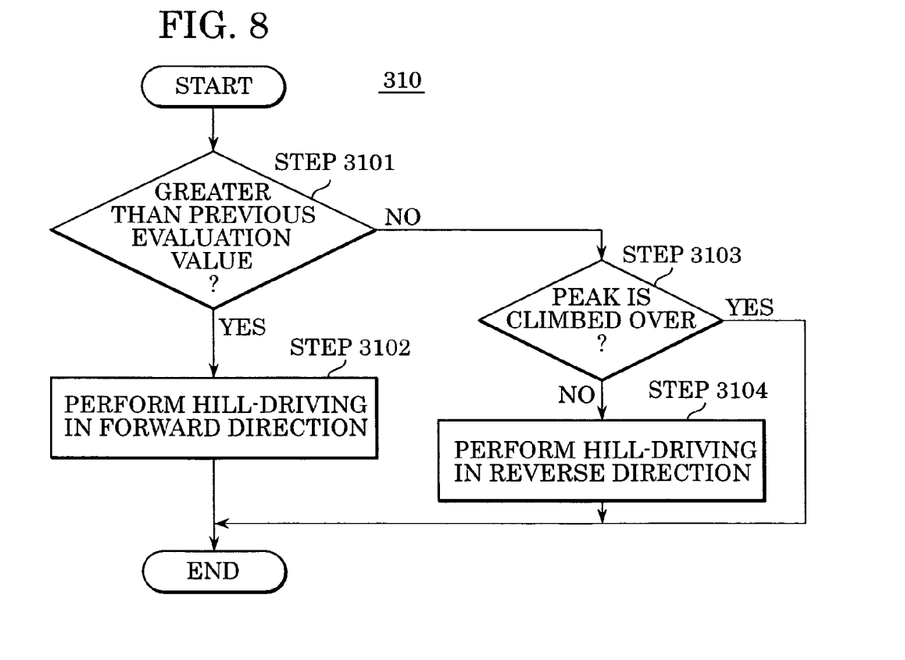
FIG. 8 is a detailed flowchart of Step 310 shown in FIG. 3, in which a hill-climbing drive process is performed.

In the hill-climbing drive process, the focus lens 105 is driven at a predetermined speed in a direction along which an AF evaluation value increases. Referring now to FIG. 8, the hill-climbing drive process will be described.

FIG. 8 is a detailed flowchart of the hill-climbing drive process performed in step S310 of FIG. 3. As is seen from FIG. 8, it is determined first whether an AF evaluation value is greater than the previous one (Step 3101). If YES, the focus lens 105 is driven for hill-climbing at a predetermined speed in the previous forward direction (Step 3102), and the hill-climbing drive process ends.

If determined in Step 3101 that the AF evaluation value is less than the previous one, it is determined next whether the AF evaluation value climbs over its peak (Step 3103). If YES, the hill-climbing drive process ends. Whereas, if the AF evaluation value decreases without climbing over its peak, the focus lens 105 is driven for hill-climbing at a predetermined speed in a reverse direction to the previous one (step S3104), and the hill-climbing drive process ends.

Figure 9:
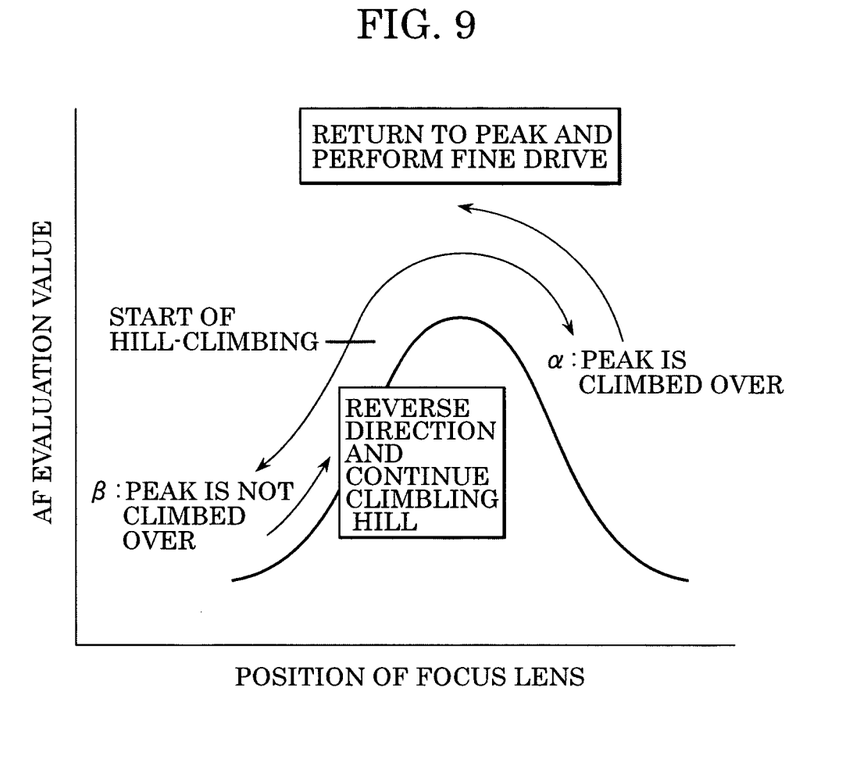
FIG. 9 is a graph of an operation of the focus lens when the hill-climbing drive process is performed.

FIG. 9 illustrates an operation of the focus lens 105 when the hill-climbing drive process is performed. In FIG. 9, the horizontal and vertical axes respectively indicate position of the focus lens 105 and AF evaluation value. Referring to FIG. 9, in the case of an operation α, determining that its focal point exists since its AF evaluation value climbs over its peak and decreases then, the hill-climbing drive process ends, and the operation moves to the fine drive process. Whereas, in the case of an operation β, determining that the focus lens 105 is moved in a wrong direction since its AF evaluation value decreases without climbing over its peak, the direction is reversed, and the hill-climbing drive process is continued.

Returning to FIG. 3, upon completion of the hill-climbing drive process (Step 310), it is determined whether the AF evaluation value climbs over its peak in the hill-climbing drive process (Step 311). If NO, the flow returns to Step 301, and the hill-climbing drive process is continued.

If YES, the focus lens 105 is set in the hill-climbing drive process performed in Step 310 so as to be returned to the position thereof providing the peak of the AF evaluation value thereat (Step 312), and the flow then proceeds to a stop mode (Step 313).

If determined in Step 309 that the image pickup apparatus 1 is not in the hill-climbing drive mode, it is then determined whether the image pickup apparatus 1 is in the stop mode (Step 314). If YES, it is further determined whether the AF evaluation value is returned to the position of the focus lens 105, providing its peak thereat (Step 315). If YES, the flow moves to the fine drive mode (Step 316). If NO, a process of returning the AF evaluation value to its peak is continued without change, and the flow returns to Step 301. If the image pickup apparatus is not in the stop mode (Step 314), the flow proceeds to Step 317 and the following steps in focus and restart determination processes are performed.

In the focus and restart determination processes, it is determined first whether the AF evaluation value varies drastically by comparing the AF evaluation value with latest one (Step 317). If YES, the flow proceeds to the fine drive mode (Step 318). If NO, (i.e., if the AF evaluation value does not vary), the flow stops without change and returns to Step 301.

As described above, the control unit 116 controls driving of the focus lens 105 so as to always achieve a maximum value of the AF evaluation value while repeating the restart determination process, the fine drive process, the hill-climbing drive process, and the stop process, thereby maintaining the focal state.

Figure 10:
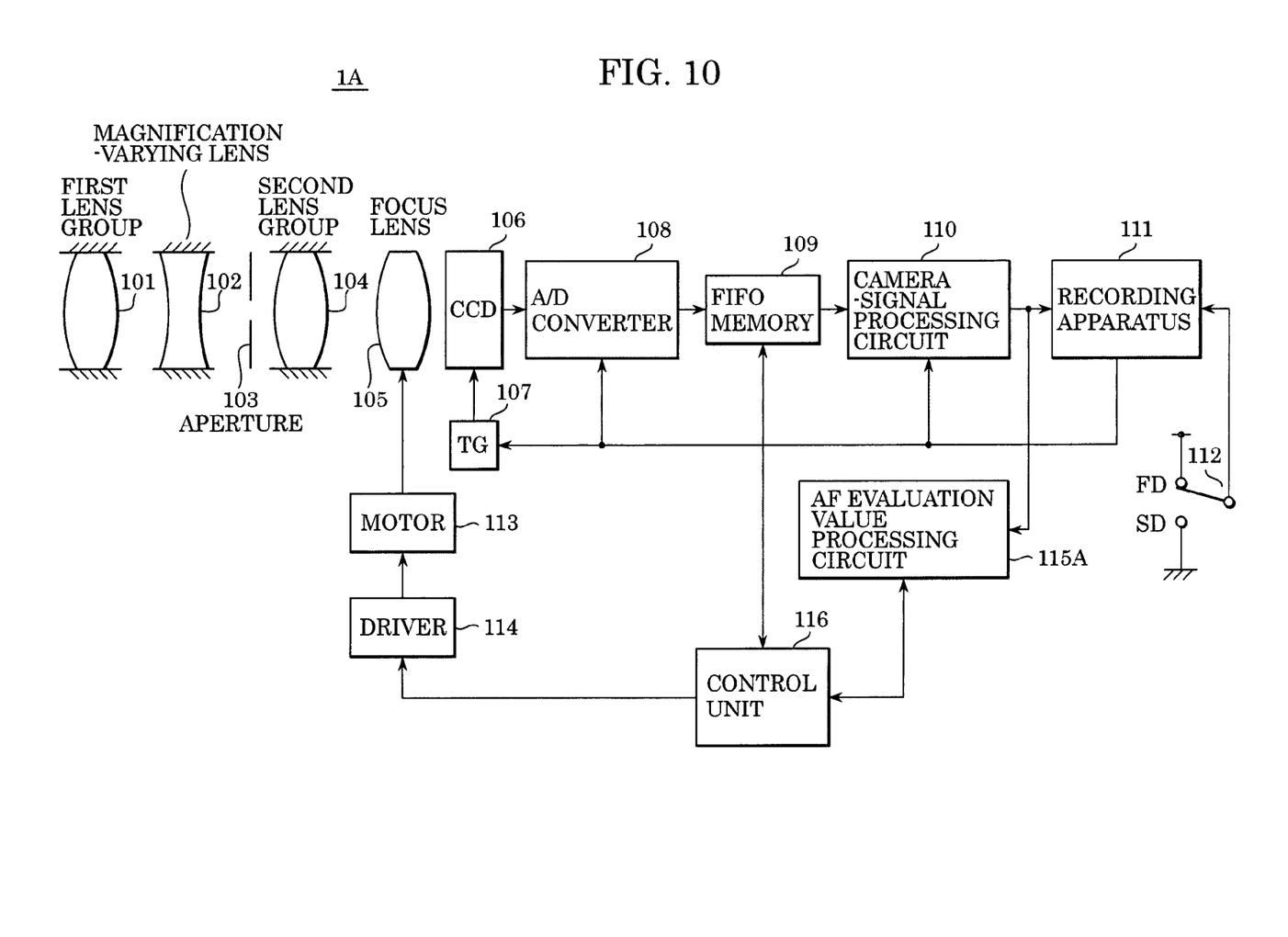
FIG. 10 is a general block diagram of an image pickup apparatus as a modification of the image pickup apparatus shown in FIG. 1.

Referring now to FIG. 10, an image pickup apparatus 1A as a modification of the image pickup apparatus 1 will be described. FIG. 10 is a general block diagram of the image pickup apparatus 1A. As shown in FIG. 10, the image pickup apparatus 1A includes: the first lens group 101; the magnification-varying lens 102; the aperture 103; the second lens group 104; the focus lens 105; the CCD 106; the pulse generator (TG) 107; the A/D converter 108; the FIFO memory 109; the camera-signal processing circuit 110; the recording apparatus 111; the selection switch 112; the motor 113, the driver 114; an AF evaluation-value processing circuit 115A; and the control unit 116.

The AF evaluation-value processing circuit 115A extracts a high frequency component, used for detecting the focal point, of an output signal of the camera-signal processing circuit 110. In the present embodiment, since a signal in accordance with the SD format is inputted in the AF evaluation-value processing circuit 115A after undergoing the reduction process, its sampling period is different from that in the image pickup apparatus 1. As such, the band-pass filter in the AF evaluation-value processing circuit 115A must be set in a different way, taking the sampling period into consideration. Hence, the filter factor is set so as to extract the same frequency band as that in accordance with the corresponding one of the HD and SD formats in the image pickup apparatus 1.

AF control performed by the control unit 116 is the same as that described with reference to FIGS. 3 to 9, except for a difference only in an input to the AF evaluation-value processing circuit 115A.

According to the image pickup apparatuses 1 and 1A, and the AF control 300 performed in the image pickup apparatuses 1 and 1A, the characteristic of the AF evaluation-value generating process can be changed in accordance with either one of the image-taking modes of the mutually different HD and SD format modes, thereby providing optimal AF evaluation values for the respective image-taking modes.

Accordingly, in the SD format mode, the image pickup apparatuses 1 and 1A can set the characteristic of the band-pass filter such that an AF evaluation value has the same characteristic as that in the known SD format mode, thereby achieving the same AF performance as that of a model exclusive for the SD format.

Whereas, in the HD format mode, by making the center frequency of the band-pass filter higher than that in the SD format mode so as to achieve a shaper shape of the characteristic of the band-pass filter than that of an AF evaluation value in accordance with the SD format, when the focus lens 105 is driven in the neighborhood of the focal point within the focal depth, the focal point is clearly noticed, thereby reliably achieving a focal state.

According to the exemplary embodiments of the present invention, an auto-focusing apparatus and an image pickup apparatus reliably achieving a focal state in accordance with an image-taking mode (a recording type) are provided.

While the exemplary embodiments of the present invention have been described, it will be understood that the present invention is not limited to these embodiments, and a variety of its changes and modifications are possible within the scope of its spirit.

The present invention is not limited to the apparatuses according the foregoing embodiments, and it is applicable to a system including a plurality of devices or an apparatus including a single device.

It will be understood that the aspects of the present invention are also achieved by providing a storage medium (a recording medium) containing a software program code implementing the functions of the foregoing embodiments to a system or an apparatus so that a computer (a CPU or MPU) of the system or the apparatus reads and executes the program code. In this case, since the program code itself, read from the storage medium, implements the functions of the forgoing embodiments, the storage medium storing the program code constitutes the present invention.

A floppy disk, a hard disk, a magnetic optical disk, a CD-ROM, a CD-R, a CD-RW, a DVD-ROM, a DVD-RAM, a DVD-RW, a DVD+RW, a magnetic tape, a nonvolatile memory card, a ROM, or the like serve as the storage medium providing the program code. Alternatively, the program code may be downloaded via a network.

Those skilled in the art will also appreciate that the present invention includes not only the case where the functions of the foregoing embodiments are implemented by executing the program code read by the computer, but also the case where the functions of the foregoing embodiments are implemented when a part of or the overall actual process is performed on the basis of the instruction of the program code by an operating system (OS) and the like running on the computer.

One skilled in the art further will appreciate that the present invention also includes the case where, after the program code read from the storage medium is written in an extended card inserted in the computer or a memory included in an extended unit connected to the computer, a part of or the overall actual process is performed by a CPU or the like included in the extended card or the extended unit on the basis of the instruction of the program code, and the functions of the foregoing embodiments are implemented through the process.

While the present invention has been described with reference to exemplary embodiments, it is to be understood that the invention is not limited to the disclosed embodiments. Whereas, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-177647 filed Jun. 15, 2004, which is hereby incorporated by reference herein.

What is claimed is:

1. An auto-focusing apparatus, comprising:
a first-signal generation unit generating a first image signal from an object light-flux reflecting an object;
an evaluation-value generation unit generating an AF evaluation value indicating a sharpness of an image from the image signal;
a control unit controlling a focus lens adjusting the position of a focal point of the object light-flux so that AF evaluation value becomes relatively large;
a second-signal generation unit able to generate an image signal corresponding to a first recording format and another image signal corresponding to a second recording format having lower-resolution than the first recording format from the first image signal;
a transfer switch for switching the recording mode to the first recording format or the second recording format; and
a modification unit lessening a move quantity of the focus lens per unit time independent of a direction in which the focus lens is moving, and generating a sharper characteristic shape of the AF evaluation value compared to the second recording format, in a case where the recording format is switched to the first recording format.

2. A control method in an exposure apparatus, generating an image from an object light-flux reflecting an object and recording the image in the image signal corresponding to a first recording format and another image signal corresponding to a second recording format having lower-resolution compared to the first recording format for controlling a focal point of the object light-flux so as to be brought in a focal state, comprising:
obtaining the corresponding one of the recording formats for recording the image; obtaining an AF evaluation indicating a sharpness of the image by a first filter in the second recording format;
obtaining an AF evaluation indicating a sharpness of the image by a second filter in the first recording format, wherein the second filter generates a sharper characteristic shape of an AF evaluation value compared to the first filter;
switching the recording mode to the first recording format or the second recording format; and
moving the position of the focal point and lessening a move quantity of the focus lens per unit time independent of a direction in which the focus lens is moving so that AF evaluation value becomes relatively large, in a case where the recording mode is switched to the first recording format.

3. A control method according to claim 2, wherein upon obtaining the AF evaluation value, further comprising:
modifying a filter factor in accordance with the corresponding recording format for applying a filtering process on the image; and
computing the maximum AF evaluation value by applying the filtering process with the modified filter factor.

4. A non-transitory computer-readable storage medium storing a program for causing a computer to execute a control method in an exposure apparatus, generating an image from an object light-flux reflecting an object and recording the image in the image signal corresponding to a first recording format and another image signal corresponding to a second recording format having lower-resolution compared to the first recording format for controlling a focal point of the object light-flux so as to be brought in a focal state, comprising:
obtaining the corresponding one of the recording formats for recording the image;
modifying a method for obtaining an AF evaluation value, for the recording format obtained by the obtaining step to generate a sharper characteristic shape of the AF evaluation value indicating a sharpness of the image in the first recording format compared to the second recording format;
switching the recording mode to the first recording format or the second recording format; and
moving the position of the focal point and lessening a move quantity of the focus lens per unit time independent of a direction in which the focus lens is moving so that AF evaluation value becomes relatively large, in a case where the recording mode is switched to the first recording format.

* * * * *